(12) United States Patent
Lertrattanapanich et al.

(10) Patent No.: US 8,223,831 B2
(45) Date of Patent: Jul. 17, 2012

(54) SYSTEM AND METHOD FOR PERIODIC PATTERN DETECTION FOR MOTION COMPENSATED INTERPOLATION

(75) Inventors: Surapong Lertrattanapanich, Irvine, CA (US); Yeong Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1425 days.

(21) Appl. No.: 11/767,453

(22) Filed: Jun. 22, 2007

(65) Prior Publication Data

US 2008/0317129 A1   Dec. 25, 2008

(51) Int. Cl.
H04J 1/16   (2006.01)

(52) U.S. Cl. ............. 375/240; 375/240.03; 375/240.12; 375/240.2; 375/240.22; 375/242

(58) Field of Classification Search .................... 375/240
See application file for complete search history.

(56) References Cited

U.S. PATENT DOCUMENTS

| | | | |
|---|---|---|---|
| 6,157,677 A * | 12/2000 | Martens et al. | 375/240.16 |
| 6,904,180 B1 * | 6/2005 | Gallagher | 382/280 |
| 6,963,605 B2 * | 11/2005 | Laurent-Chatenet | 375/240 |
| 7,139,427 B2 | 11/2006 | Kim | |
| 7,349,583 B2 * | 3/2008 | Kumar et al. | 382/294 |
| 7,720,288 B2 * | 5/2010 | Luo et al. | 382/191 |
| 7,751,482 B1 * | 7/2010 | Srinivasan et al. | 375/240.16 |
| 7,899,114 B2 * | 3/2011 | Kostrzewski et al. | 375/240.01 |
| 2004/0086197 A1 * | 5/2004 | Fletcher et al. | 382/276 |
| 2004/0247028 A1 | 12/2004 | Kim | |
| 2005/0018873 A1 * | 1/2005 | Rhoads | 382/100 |
| 2005/0094852 A1 * | 5/2005 | Kumar et al. | 382/107 |
| 2005/0147323 A1 * | 7/2005 | Gallagher | 382/286 |
| 2006/0083407 A1 * | 4/2006 | Zimmermann et al. | 382/107 |
| 2006/0245500 A1 * | 11/2006 | Yonovitz | 375/240.19 |
| 2007/0223838 A1 * | 9/2007 | Luo et al. | 382/286 |

* cited by examiner

*Primary Examiner* — Nathan Flynn
*Assistant Examiner* — Viral Lakhia

(57) ABSTRACT

A method for detecting a pattern in an image includes defining a set of pixel values in an image using a window and calculating a Fourier transform of the pixel values. In one embodiment, the Fourier transform of the pixel values forms a spectrum. The method further comprises analyzing the spectrum of the Fourier transform to find a peak and analyzing the peak to determine whether the peak is indicative of the presence of a pattern in the image.

21 Claims, 11 Drawing Sheets

SYSTEM AND METHOD FOR PERIODIC PATTERN DETECTION FOR MOTION COMPENSATED INTERPOLATION

BACKGROUND

1. Field of the Invention

This disclosure is related to video processing, and more particularly, to motion estimation and compensation for a periodic pattern.

2. Description of the Related Technology

In video processing, typically only a fraction of an image changes in an image frame sequence, allowing prediction of object movement in the frame sequence. Motion compensation is used as part of the predictive process. If a frame sequence shows moving objects, then the objects' motion within the scene can be measured, and this information may be used to predict the content of frames later in the sequence of frames or between frames.

In video encoding, motion estimation is used to eliminate the temporal redundancy of video information and therefore forms a central part of video coding standards. As such, motion compensation relies on motion estimation for many video processing applications. Motion compensation is used in video compression (such as MPEG-2 and MPEG-4), frame rate conversion, noise reduction, de-interlacing, and format conversion. The core function of motion compensation and motion estimation is to find motion between sequential video frames or, equivalently, to find motion vectors between objects in the frames.

Many motion estimation methods have been developed. The simplest motion estimation method is a block-matching algorithm, wherein the pixel values in blocks of each frame are estimated by a displaced block of similar shape and size in a past frame. As such, this method finds the best match for a block of a target picture frame within a search area in a reference picture frame. Estimating motion results in a motion vector, which represents the geometrical displacement between the two matched blocks. The motion vector is determined by finding a vector that essentially minimizes a cost function that is a measure of mismatch between the reference and the target blocks. Other, more advanced motion estimation algorithms may also be employed.

A disadvantage of conventional motion estimation methods is that in some cases the determined motion vector is incorrect. Incorrect estimation of a motion vector may introduce visual artifacts in a motion-compensation interpolated image.

SUMMARY OF CERTAIN INVENTIVE ASPECTS

Various embodiments of a method for detecting a pattern in an image include defining a set of pixel values in an image using a window and calculating a Fourier transform of the pixel values. In one embodiment, the Fourier transform of the pixel values forms a spectrum. The method further comprises analyzing the spectrum of the Fourier transform to find a peak and analyzing the peak to determine whether the peak is indicative of the presence of a pattern in the image.

Analyzing the spectrum of the Fourier transform can further include determining whether there is a single peak in the spectrum. Analyzing the spectrum of the Fourier transform can also include determining whether the peak exceeds a threshold value. In some implementations, it is determined whether a ratio of peak power to total power exceeds a threshold value. One embodiment of the spectrum is a power spectrum.

One particular implementation of the window includes a horizontal one-dimensional window and a vertical one-dimensional window. The existence of a peak in either the horizontal or vertical one-dimensional window can indicate the presence of a pattern in the image.

In addition to the above, the image may be post-rendered to provide a pattern level corresponding to one or more pixels in the image. Interpolation may be performed using the pattern level. In addition, the pixel values of certain embodiments comprise luminance values.

In certain implementations, a system for detecting a pattern in a frame of a video sequence includes a sampling module that defines a set of pixel values in a video frame using a sampling window and a signal processor that calculates a mathematical transform of the pixel values in the sampling window. The mathematical transform of certain embodiments forms a spectrum of values. A spectrum analysis module analyzes the spectrum to find a peak and analyzes the peak to determine whether the peak is indicative of the presence of a pattern in the image.

DETAILED DESCRIPTION OF CERTAIN INVENTIVE EMBODIMENTS

Specific embodiments of the inventions will now be described with reference to the drawings. These embodiments are intended to illustrate, and not limit, the inventions described herein. The scope of the inventions is defined by the claims. In this description, reference is made to the drawings wherein like parts are designated with like numerals throughout.

In video processing, applications related to motion compensated algorithms such as video compression and coding, interlaced-to-progressive (IPC) conversion, deinterlacing, and frame rate conversion (FRC) rely on the quality of the motion estimation (ME) algorithm. The ME algorithm analyzes at least a pair of two images to estimate a motion vector field (MVF) from one image to the other image. There are various ME algorithms ranging from the very simple, e.g., the block matching algorithm, to the advanced, such as 3-D recursive motion estimation (RME). However, none of these ME algorithms yield a reliable MVF when objects with periodic patterns occur in the pair of images.

Figure 1:
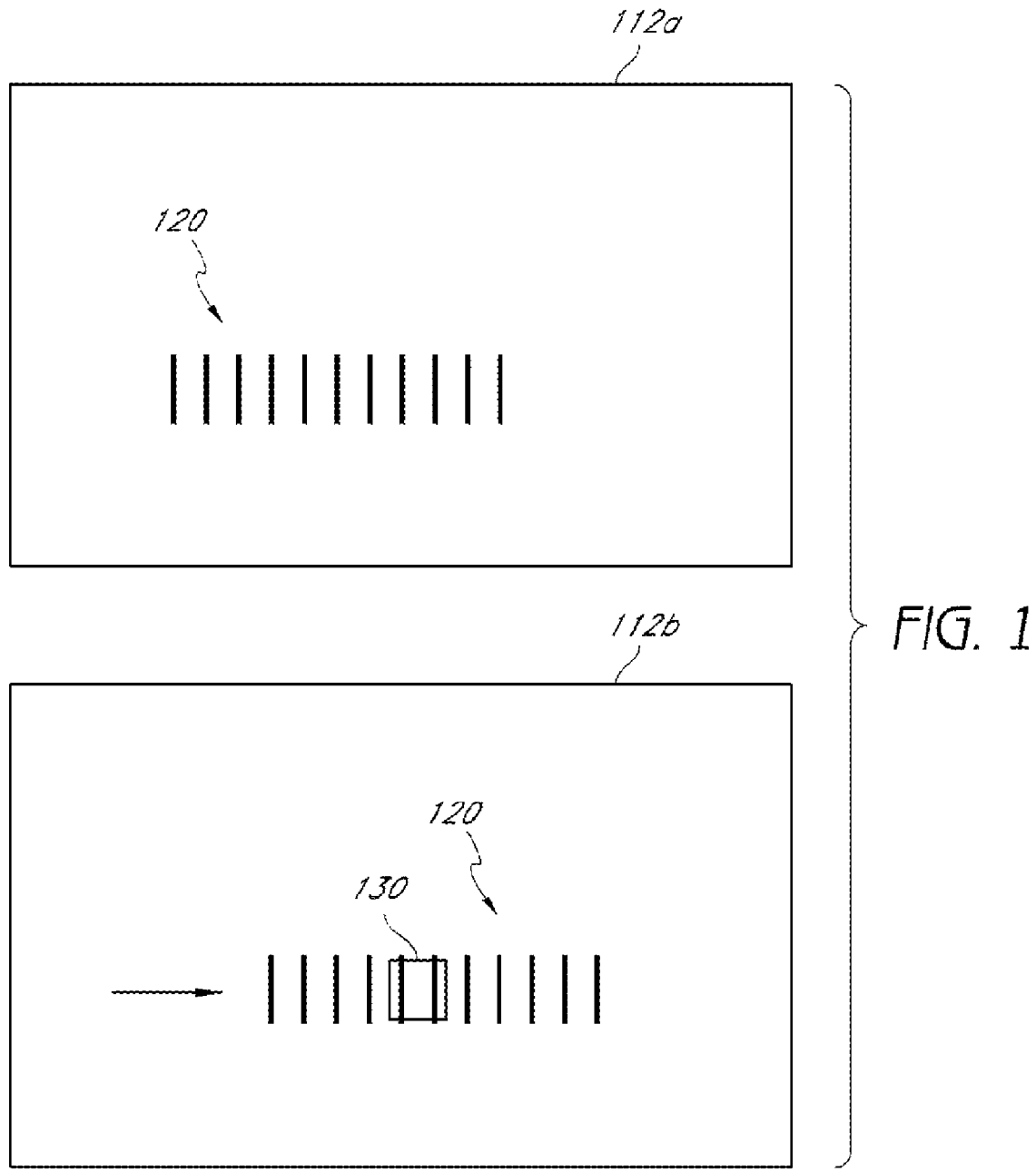
FIG. 1 is a block diagram illustrating a pattern in two frames of a video sequence.

To illustrate at least some of the problems caused by periodic patterns, FIG. 1 depicts a periodic pattern 120 in two frames 112, namely a first frame 112a and a second frame 112b. When the frames 112 are displayed in a video sequence, the periodic pattern 120 appears to move, as indicated by the arrow in the second frame 112b.

Certain ME algorithms partition images into blocks 130 of pixels. These algorithms analyze the motion vectors between blocks 130 of the second frame 112b (e.g., a current frame) and corresponding blocks (not shown) in the first frame 112a (e.g., a previous frame). However, when a block 130 contains pixels that are part of a periodic pattern 120, it may be difficult to obtain the correct motion vector because the pixels may not appear to have moved or might appear to have moved more or less than they actually moved.

In the depicted example, the periodic pattern 120 has changed position in the second frame 112b, but because the pattern 120 repeats, multiple motion vectors may be generated from the block 130. Consequently, the motion vector chosen may be unreliable.

Figure 2:
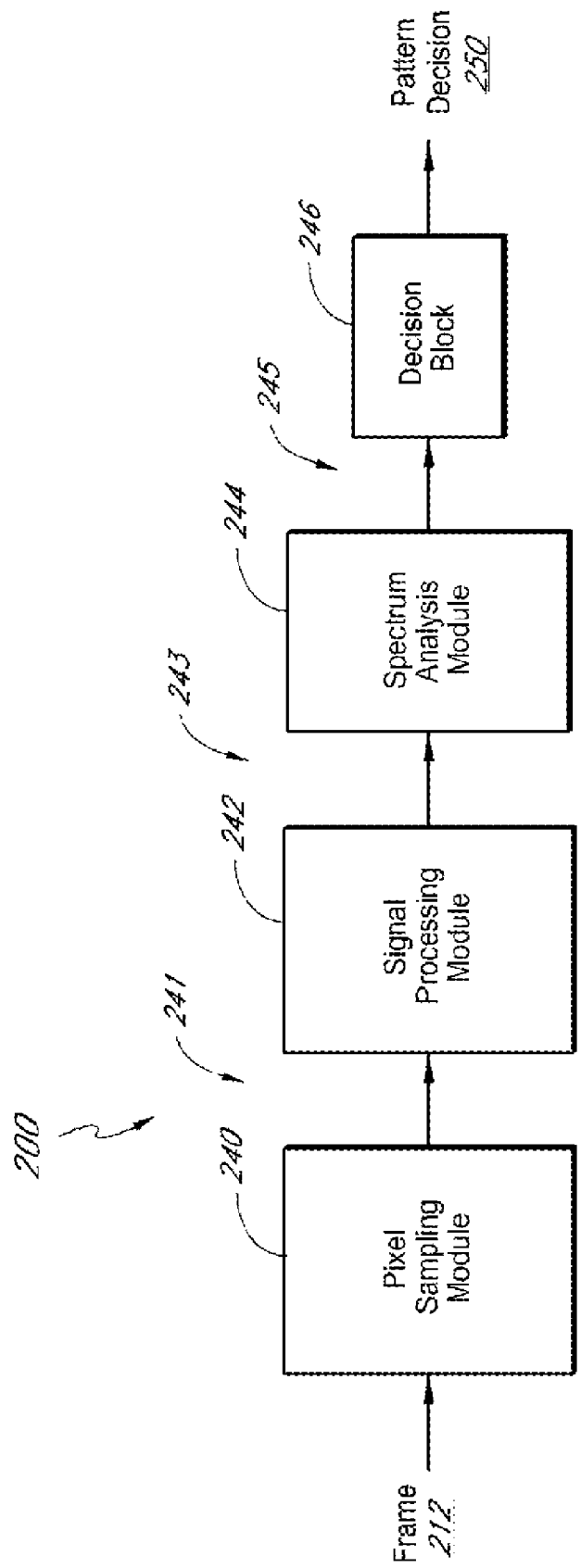
FIG. 2 is a functional block diagram illustrating an embodiment of a pattern detection system.

FIG. 2 illustrates certain embodiments of a pattern detection system 200 that reduce or entirely overcome these problems. The pattern detection system 200 includes a pixel sampling module 240, a signal processing module 242, a spectrum analysis module 244, and a decision block 246. The pattern detection system 200 facilitates detecting patterns in a frame 212.

The pattern detection system 200 provides the frame 212 to a pixel sampling module 240. The pixel sampling module 240 is a hardware component, a software component, or a combination of the same. In an embodiment, the pixel sampling module 240 partitions the frame 212 into blocks and samples a set of pixels within each block. An embodiment of pixel samples is described in detail with respect to FIGS. 3 and 4 below. The pixel sampling module 240 provides pixel samples 241 to the signal processing module 242.

The signal processing module 242 of various embodiments processes the pixel samples 241. Like the pixel sampling module 240, the signal processing module 242 may be a hardware component, a software component, or a combination of the same. For example, the signal processing module 242 may be implemented in one embodiment as software running on a digital signal processor (DSP). In one embodiment, the signal processing module 242 performs a mathematical transform on the pixel samples 241, such as a Fourier transform, Z-transform, wavelet transform, or the like. The mathematical transform produces a spectrum 243 of values corresponding to the pixel samples 241.

In one embodiment, the Fourier transform is used to produce a frequency spectrum 243, facilitating detecting patterns in the frequency domain. Analyzing the pixel samples 241 in the frequency domain, rather than the spatial domain, provides certain advantages. For instance, the frequency spectrum 243 may be analyzed to identify patterns occurring at particular frequencies. In some implementations, less processing is used to produce and analyze the frequency spectrum 243 than may be used with spatial domain techniques. Moreover, analyzing the pixel samples 241 in the frequency domain may produce more reliable results than analyzing the pixel samples 241 in the spatial domain.

The signal processing module 242 provides the frequency spectrum 243 to a spectrum analysis module 244. The spectrum analysis module 244 is implemented as a spectrum analyzer in one embodiment, which may be further implemented in hardware and/or software. The spectrum analysis module 244 in certain configurations includes one or more spectrum analyzers that examine the frequency spectrum 243 to identify peaks in the spectrum 243, which may indicate the presence of a periodic pattern.

In an example embodiment, the spectrum analysis module 244 analyzes a power spectrum corresponding to the spectrum 243 to find and analyze peaks in the power spectrum. Examples of finding and analyzing peaks are described below with respect to FIGS. 6 and 7. In alternative embodiments, the spectrum analysis module 244 analyzes the magnitude spectrum, energy spectrum, or the like instead of the power spectrum.

The spectrum analysis module 244 provides an output 245 to a decision block 246. In one embodiment, the decision block 246 further analyzes the output 245 to determine whether a pattern exists in the pixel samples 241. The decision block 246 then provides a pattern decision 250, which indicates whether a pattern is present. Alternatively, the spectrum analysis module 244 outputs the pattern decision 250 directly.

Figure 3:
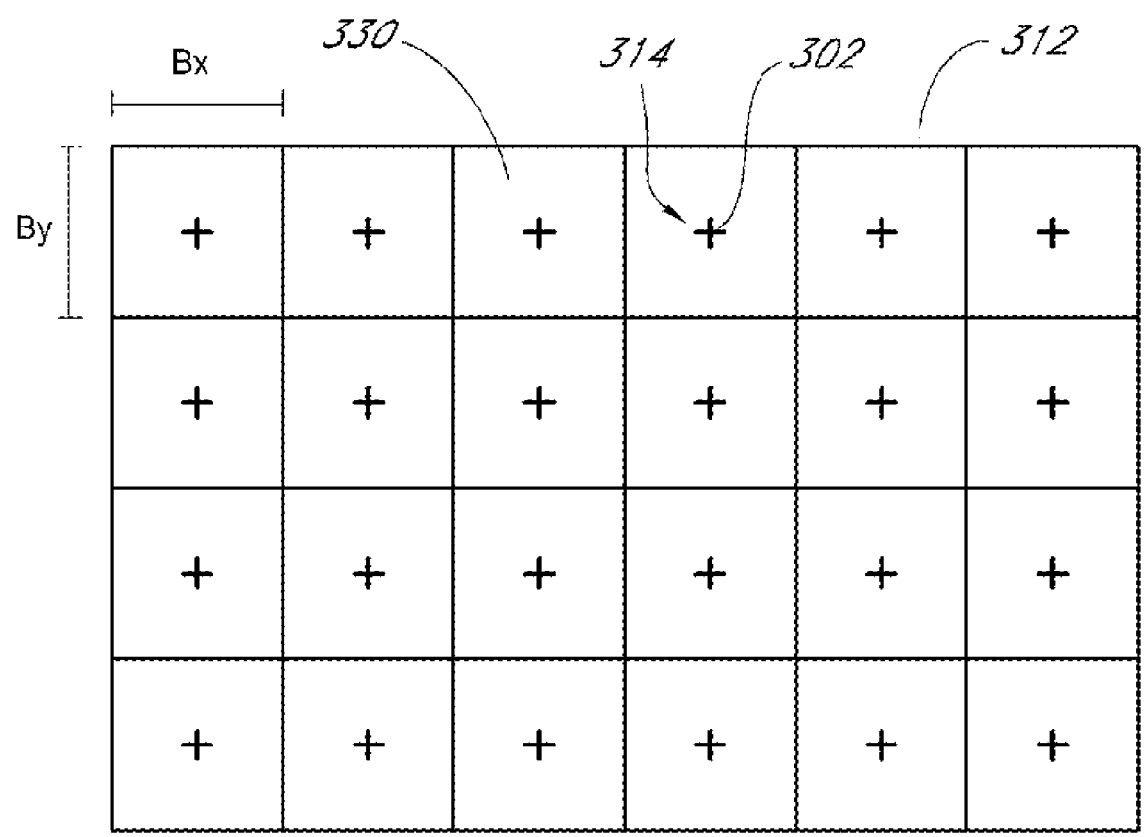
FIG. 3 is a block diagram illustrating an embodiment of a frame divided into blocks.

FIG. 3 illustrates an embodiment of pixel sampling performed, e.g., by the pixel sampling module 240 of FIG. 2. A frame 312 is shown partitioned into a plurality of blocks 330 each having a width Bx and a height By in pixels. In one embodiment, the blocks 330 have a width Bx of 16 pixels and a height By of 16 pixels, although other dimensions may be chosen. While the frame 312 is shown partitioned into equal block sizes, the blocks 330 may alternatively have different sizes or overlap one another. In addition, in an embodiment, less than the entire frame 312 is partitioned into the blocks 330.

Each block 330 in the depicted embodiment includes a sampling grid 302. The sampling grid 302 is a pixel, or alternatively, may be a group of pixels. In a particular implementation, the sampling grid 302 is the central pixel of the block 330. One or more sampling windows 314, illustrated as "+" symbols, are constructed about the sampling grid 302. The one or more sampling windows are used to obtain a sample of pixels from the block 330.

Figure 4:
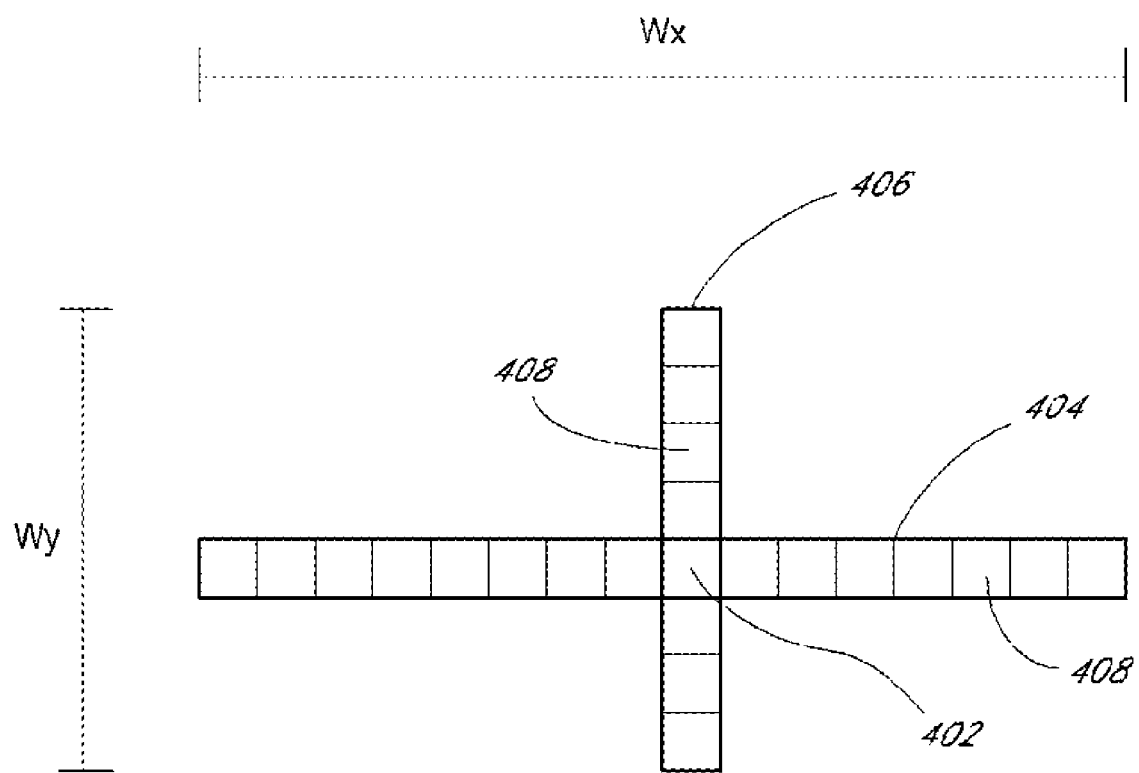
FIG. 4 is a block diagram illustrating an embodiment of sampling windows.

Example sampling windows 404, 406 are shown in FIG. 4. The sampling windows 404, 406 include a horizontal sampling window 404 and a vertical sampling window 406. Each sampling window 404, 406 includes a one-dimensional (1-D) line of pixels 408 with the sampling grid (pixel) 402 at the intersection of the two sampling windows 404, 406.

More generally, in certain embodiments the sampling windows 404, 406 are chosen to be orthogonal (e.g., perpendicular) to each other. As one example, the horizontal and vertical sampling windows 404, 406 are 90 degrees apart from each other and are therefore orthogonal. In one embodiment, the horizontal sampling window 404 is at 0 degrees relative to a horizontal axis, and the vertical sampling window 406 is at 90 degrees. Other sampling windows may be chosen at other angles from the horizontal (or other) axis, such as 45 degrees and 135 degrees.

Each example sampling windows 404, 406 has a window length W in pixels, represented as length Wx for the horizontal sampling window 404 and length Wy for the vertical sampling window 406. In the depicted embodiment, the window length Wx is 16 pixels and the window length Wy is 8 pixels. The window lengths Wx, Wy of various embodiments may be chosen to be less than, greater than, or equal to the respective dimensions Bx, By of a block 330. As illustrated in FIG. 4, the window lengths Wx, Wy need not be equal; however, in some embodiments, the window lengths Wx, Wy may be chosen to be equal. In one embodiment, one or more of the window lengths Wx, Wy may be chosen to be a power of two (e.g., $2^3$, $2^4$, or the like) to enable the sampling windows 404, 406 to be processed by certain implementations of the fast Fourier transform (FFT) algorithm, e.g., by the signal processing module 242 of FIG. 2.

The window lengths Wx, Wy may be chosen to detect a particular granularity of pattern. Shorter window lengths Wx, Wy may be chosen to detect patterns with high granularity, and longer window lengths Wx, Wy may be chosen to detect patterns with low granularity. However, in some cases the window lengths Wx, Wy can be set too long and cover more than the pattern, leading to possible erroneous results. Conversely, the window lengths Wx, Wy can be set too short and therefore not detect the pattern at all. Consequently, in some implementations, block sizes Bx, By and window sizes Wx, Wy may be adjusted to detect patterns.

Figure 5A:
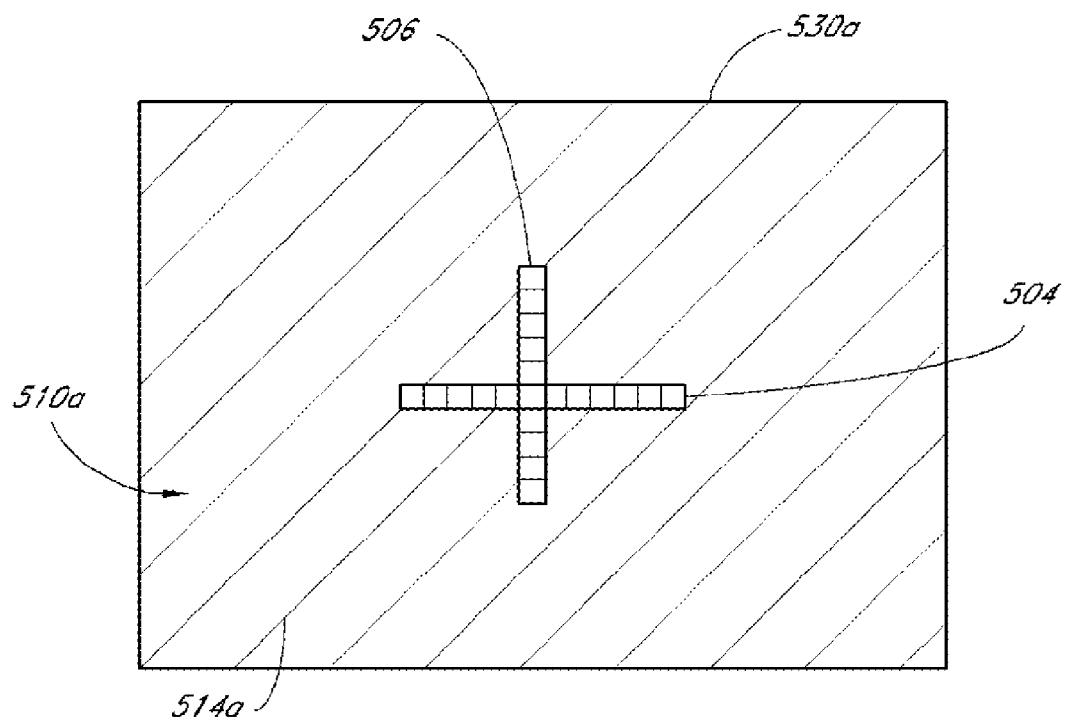
FIG. 5A is a block diagram illustrating an embodiment of the sampling windows of FIG. 4 superimposed on an example pattern.
Figure 5B:
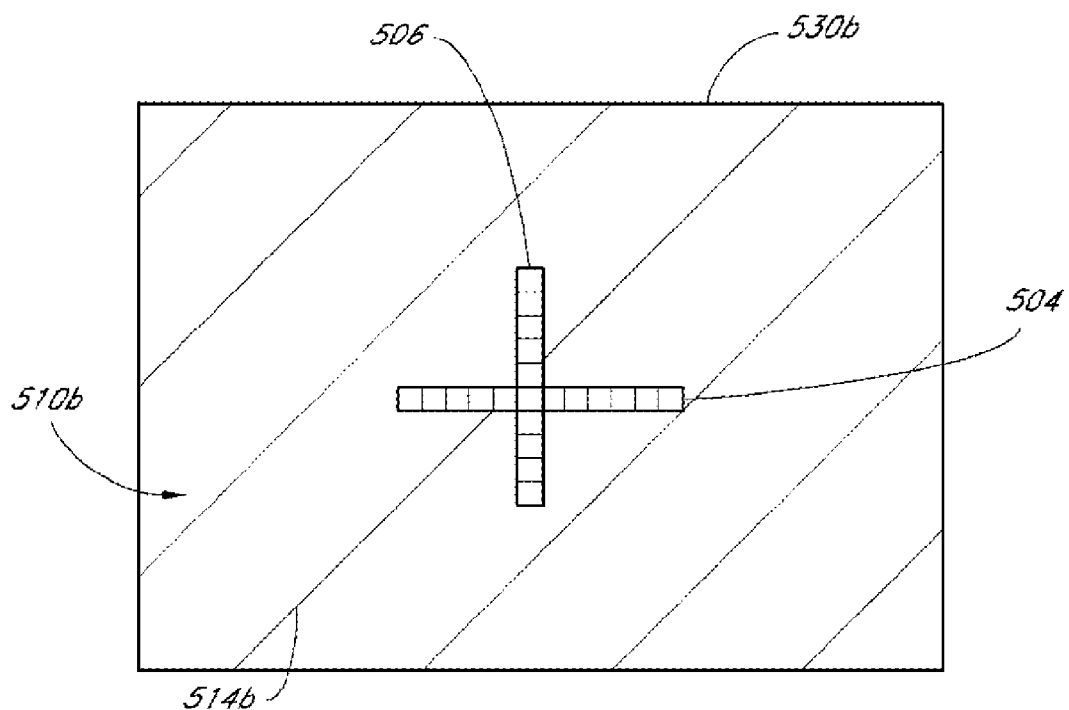
FIG. 5B is a block diagram illustrating an embodiment of the sampling windows of FIG. 4 superimposed on another example pattern.

To illustrate some effects of choosing the window lengths Wx, Wy, two example periodic patterns 510a, 510b having different granularity are shown in FIGS. 5A and 5B. Example sampling windows 504, 506 are superimposed on the patterns 510a, 510b. The pattern 510a of FIG. 5A includes a set of parallel lines 514a spaced equally within a block 530a. Likewise, the pattern 510a of FIG. 5B includes a set of parallel lines 514b spaced equally within a block 530b. The pattern 510a of FIG. 5A is at a higher granularity than the pattern 510b of FIG. 5B because the lines 514a are spaced closer together than the lines 514b.

A horizontal sampling window 504 and a vertical sampling window 506 are superimposed on the block 530a and on the block 530b. The lengths Wx, Wy of the sampling windows 504, 506 in the block 530a are equal to the lengths Wx, Wy of the sampling windows 504, 506 in the block 530b. In the block 530a, the sampling windows 504, 506 overlap multiple lines 514a in the pattern 510a. In contrast, the same-sized sampling windows 504, 506 overlap only one line 514b in the pattern 510b. Because the sampling windows 504, 506 overlap multiple lines 514a, sampling windows 504, 506 in one embodiment are a good size to facilitate detecting the pattern 510a. In contrast, the sampling windows 504, 506 in one embodiment are not a good size to facilitate detecting the pattern 510b because the sampling windows 504, 506 overlap only one line 514b.

Figure 6:
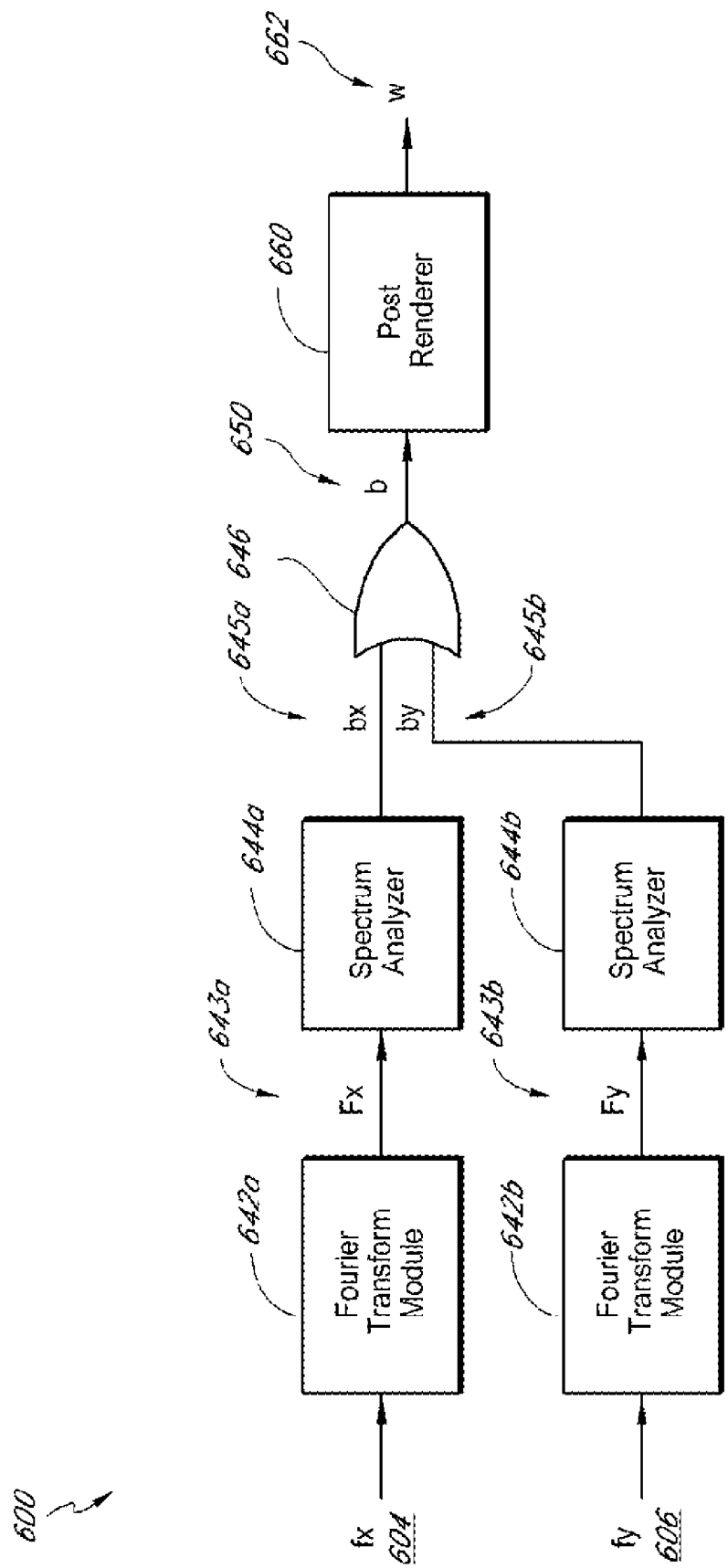
FIG. 6 is a functional block diagram illustrating an embodiment of a pattern detection and rendering system.

FIG. 6 is a functional block diagram illustrating an example pattern detection and rendering system 600. The pattern detection and rendering system 600 receives an input vector fx 604 of length Wx and an input vector fy 606 of length Wy. The input vector fx 604 includes a collection of luminance values of pixels obtained from a horizontal sampling window, and input vector fy 606 includes a collection of luminance values of pixels obtained from a vertical sampling window. These values may be represented as a set of luminance values $h_i$ and $v_i$ respectively, such that fx=$\{h_0, h_1, \ldots, h_{Wx-1}\}$, and fy=$\{v_0, v_1, \ldots, v_{Wy-1}\}$. In one embodiment, the luminance values $h_i$, $v_i$ are real integer values ranging from 0 to 255. However, values other than luminance may be used in other embodiments, such as intensity, luminous flux, luminous energy, luminous emittance, chrominance, or the like, or a combination of the above.

Each of the input vectors fx 604 and fy 606 are provided to a Fourier transform module 642a or 642b, respectively. In one embodiment, the Fourier transform modules 642a, 642b perform a 1-D FFT of the corresponding input vector fx 604 or fy 606. The Fourier transform modules 642 therefore provide outputs Fx and Fy 643, which may be represented as Fx=$\{H_0, H_1, \ldots, H_{Wx-1}\}$ and Fy=$\{V_0, V_1, \ldots, V_{Wy-1}\}$. The outputs Fx and Fy 643 in one embodiment include the frequency components of the input vectors fx and fy.

The outputs Fx and Fy 643 are provided to a spectrum analyzer 644a or 644b, respectively. The spectrum analyzers 644 of various embodiments may be implemented in hardware and/or software. The spectrum analyzers 644a, 644b analyze the frequency components of the output vectors Fx and Fy 643, respectively.

In certain embodiments, the spectrum analyzers 644 compute the power spectrum of the output vectors Fx 643a and Fy 643b. Because the input vectors fx and fy of certain embodiments include entirely real numbers (e.g., pixel luminance values are real in one embodiment), only half of the power spectrum is analyzed due to the symmetry property of the FFT (e.g., half of the FFT output includes the complex conjugate of the other half). The power spectrum Sx in one implementation is determined by the relation Sx=$\{S_0, S_1, \ldots, S_{Wx/2-1}\}$, where $S_i$=Re($H_i$)$^2$+Im($H_i$)$^2$ and where Re( ) and Im( ) are the real and imaginary parts of the values $H_i$, respectively. The power spectrum Sy is calculated in a similar manner.

In various embodiments, the spectrum analyzers 644 analyze the power spectrum Sx, Sy to determine if a single peak exists in the power spectrum, as described in further detail with respect to FIG. 7, below. A single peak in one or both of the power spectrums Sx or Sy increases the likelihood that a periodic pattern exists in either the horizontal or vertical direction, or in a combination of the horizontal and vertical directions. Alternatively, if more than one peak exists, in some implementations there is no periodic pattern.

If a peak exists in the power spectrum Sx or Sy, the spectrum analyzer 644 further determines whether a ratio of the power at the peak ("peak power") to the total power of the power spectrum Sx or Sy exceeds a threshold. This threshold may be determined by observation or experimentation. If the ratio exceeds the threshold, the spectrum analyzer 644 has detected a pattern and provides an output 645 indicating the presence of the pattern. In one embodiment, the output 645 from each spectrum analyzer 644, denoted as br 645a and by 645b respectively, are binary decisions. Thus, in an example embodiment, if a pattern exists, the spectrum analyzer 644 outputs a binary value "True," whereas if a pattern does not exist, the spectrum analyzer 644 outputs the binary value "False."

The binary decisions bh 645a, by 645b are provided to a decision block 646. In the depicted embodiment, the decision block 646 is represented as a logic OR-gate. The decision block 646 therefore provides a pattern decision output 650 as an OR of the binary decisions bh 645a, by 645b. In other words, if either the binary decision bh 645a or the binary decision by 645b are True, the decision block 646 outputs a True value as the pattern decision 650, indicating the presence of a pattern. Alternatively, if both the binary decisions bx 645a, by 645b are false, the decision block 646 outputs a False value as the pattern decision 650, indicating that no pattern is present.

The pattern decision 650 is provided to a post renderer 660. In one embodiment, the post renderer 660 applies the pattern decisions 650 to some of all of the blocks in an image and then renders the pattern decision 650 from a sampling grid resolution to a pixel grid resolution. The post renderer 660 then outputs a pattern level w 662, which may be used to improve motion compensated interpolation. The functions of the post renderer 660 are described in further detail with respect to FIG. 9.

Figure 7:
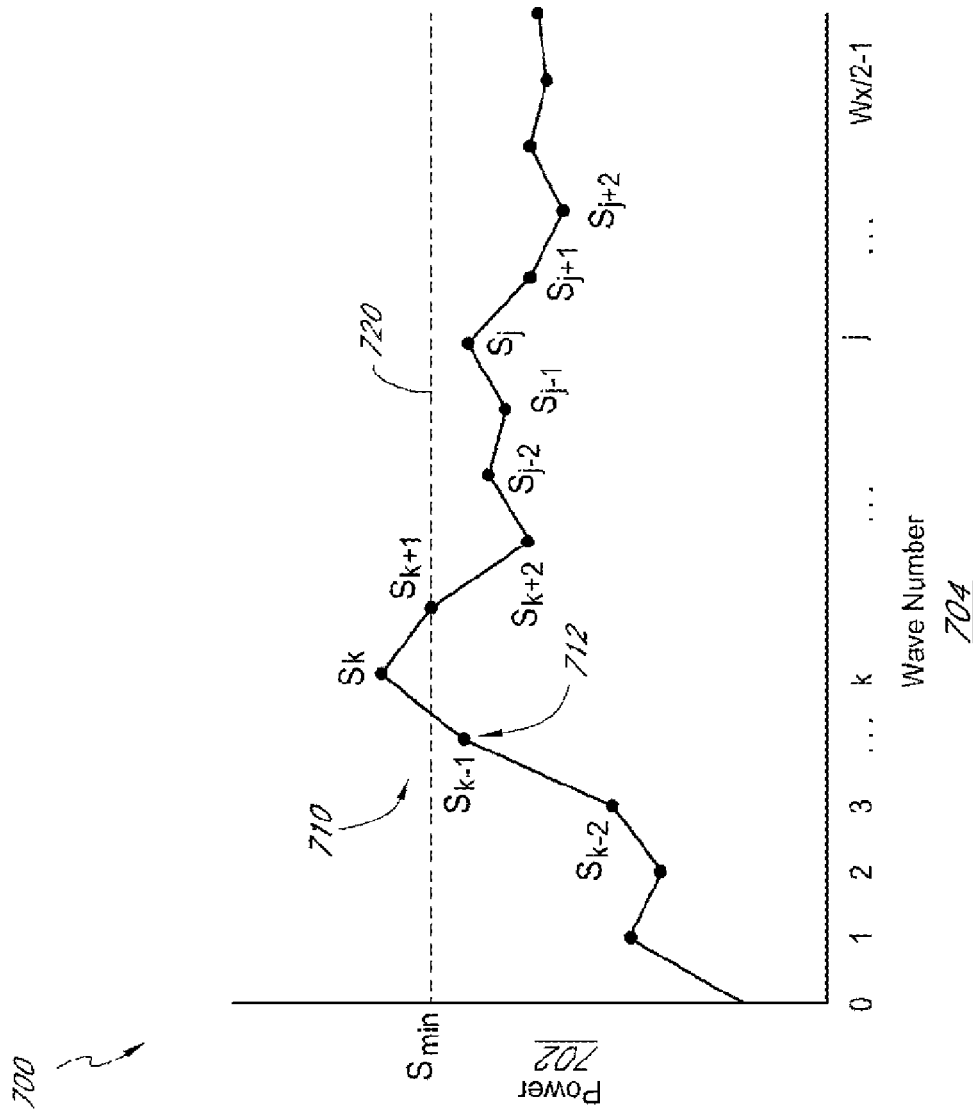
FIG. 7 is a graphic illustration of an embodiment of a spectrum corresponding to the Fourier transform of an example sample window.

FIG. 7 illustrates a graph 700 of an example power spectrum 710 corresponding to the Fourier transform of a horizontal sample window. For brevity, the power spectrum of an example horizontal sampling window is shown. In certain embodiments, the power spectrum of a vertical sampling window may be analyzed in the same or a similar fashion.

The depicted graph 700 includes a wave number axis 704 and a power axis 702. The wave number axis 704 includes wave numbers from 0 to $W_x/2-1$, where each wave number corresponds to a point 712 in the power spectrum 710. The power axis 702 indicates the power of the power spectrum 710.

The example power spectrum 710 includes a peak having power $S_k$ at a point k, where k is an integer selected from the set of wave numbers. In one embodiment, a peak exists at point k if the following conditions are satisfied:

$$S_k > S_{k-1} > S_{k-2} \quad (1)$$

$$S_k > S_{k+1} > S_{k+2}. \quad (2)$$

Conditions (1) and (2) are satisfied when the power at the point k is greater than the power at the two surrounding points k−1 and k+1 and when the power at the points k−1 and k+1 is greater than the power at the next point k−2 or k+2, respectively. Illustrated graphically on the graph 700, the point k having power $S_k$ has greater power than the surrounding points k−1 and k−2, and the power at k−1 is greater than that at k−2, and the power at k+1 is greater than that at k+2.

In contrast, at another example point j shown on the graph 700, the power $S_j$ at the point j satisfies condition (2) but not (1). The immediate points surrounding j, including j−1 and j+1, have less power than the power at j, and the power at j+1 is greater than the power at j+2. However, the power at j−2 is greater than the power at j−1, so the point j is not a peak.

In these examples, five points 712 are evaluated to determine if the middle of the five points 712 is a peak. Alternative embodiments contemplate that the number of points 712 used to evaluate the existence of a peak could be fewer or greater, including 3, 4, 6, 7, 8, 9, or more points 712. In addition, the number of points 712 evaluated in one embodiment need not be symmetrical about the point k. For example, two points 712 could be evaluated to the left of the point k and three points could be evaluated to the right. Moreover, the actual differences in power may be taken into account. For example, in one embodiment, if the magnitude difference between $S_k$ and $S_{k\pm1}$ or between $S_{k\pm1}$ and $S_{k\pm2}$ is slight (e.g., below a threshold), then a peak is not found.

In an embodiment, conditions (1) and (2) indicate the possibility, but do not confirm, the existence of a peak. If conditions (1) and (2) are satisfied, in one embodiment it is further determined whether $$S_k > S_{min}, \quad (3)$$

where $S_{min}$ is a minimum peak power 720. The minimum peak power 720 is shown in FIG. 7 as a dashed line on the graph 700. The minimum peak power 720 may be determined experimentally. In such embodiments, if condition (3) is satisfied, then a peak is considered to exist at the point k.

If a single peak is determined to exist in the waveform 710, in one embodiment it is further determined whether a ratio of peak power $P_k$ to total power T (excluding the DC component) exceeds a predetermined threshold. This threshold may be derived, for example, by experimentation. The peak power $P_k$ may be computed by the following:

$$P_k = \sum_{i=k-2}^{k+2} S_i. \quad (4)$$

The total power T may be computed in one embodiment as $$T = \sum_{i=1}^{WX/2-1} S_i. \quad (5)$$

In an embodiment, if the ratio determined by equation (4) divided by equation (5) is greater than the threshold, then a periodic pattern is said to exist in the corresponding sampling window.

Figure 8:
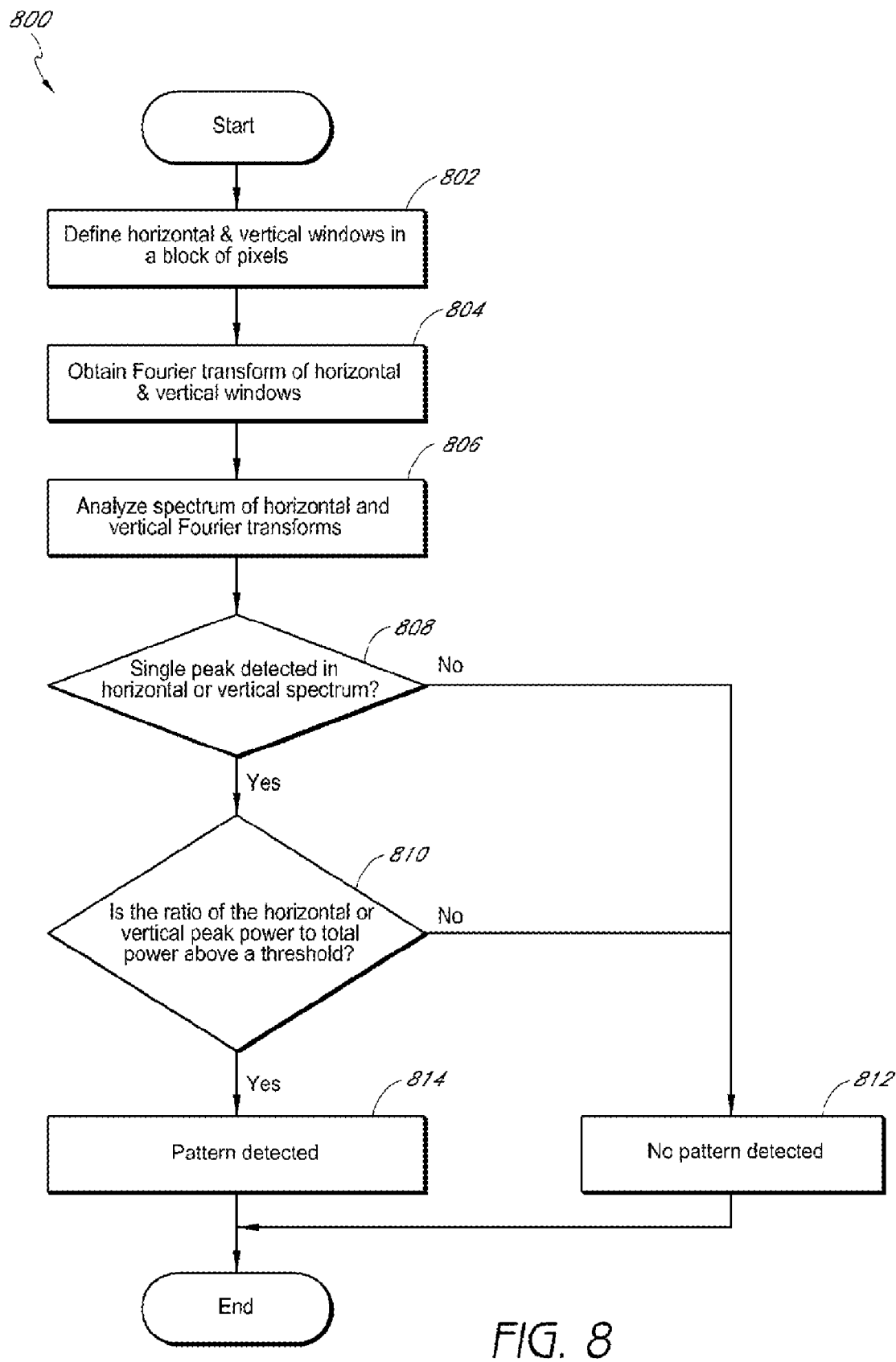
FIG. 8 is a flowchart illustrating a method of detecting patterns in a frame.

FIG. 8 illustrates a method 800 of detecting periodic patterns in a frame. In one embodiment, the method 800 is performed by any of the pattern detection systems described above. Advantageously, the method 800 enables detection of patterns in video sequences, thereby improving motion estimation algorithms employed for motion compensated interpolation.

At 802, the method 800 defines horizontal and vertical windows in a block of pixels. In an embodiment, this step is performed by a pixel sampling module, such as the pixel sampling module 240 of FIG. 2. The windowed samples in one embodiment include a 1-D set of pixels, although 2-D sets of pixels may also be included in one or more windows. In addition, while the depicted embodiment of the method 800 defines both horizontal and vertical windows, the method 800 may alternatively define only a horizontal or only a vertical window instead.

The method 800 at 804 obtains a Fourier transform of pixel values in the horizontal and vertical windows. In an embodiment, this step is performed by a signal processing module, such as the signal processing module 242 of FIG. 2. The Fourier transform advantageously enables analyzing the windowed samples in the frequency domain, which in certain embodiments facilitates more accurate pattern detection and less processing than the spatial domain. Other mathematical transforms may also be used to analyze the frequency components.

At 806, the method 800 determines whether a single peak is detected in either the horizontal or the vertical frequency spectrum. This detection may be performed by a spectrum analysis module, such as the spectrum analysis module 244 of FIG. 2. The step 806 may entail detecting whether a point in the frequency spectrum has higher power than other surrounding points and determining whether the power at that point is higher than a threshold. In addition, the step 806 may further include determining if only a single peak exists in the spectrum. However, in alternative embodiments, a pattern may exist even when there are multiple peaks.

If a single peak is not detected in step 808, in one embodiment the method 800 determines that no pattern has been detected at 812. Otherwise, the method 800 proceeds at 810 to determine whether a ratio of the horizontal or vertical peak power to total power is above a threshold. If the ratio is above the threshold, then the method 800 determines at 814 that a pattern is detected.

Figure 9:
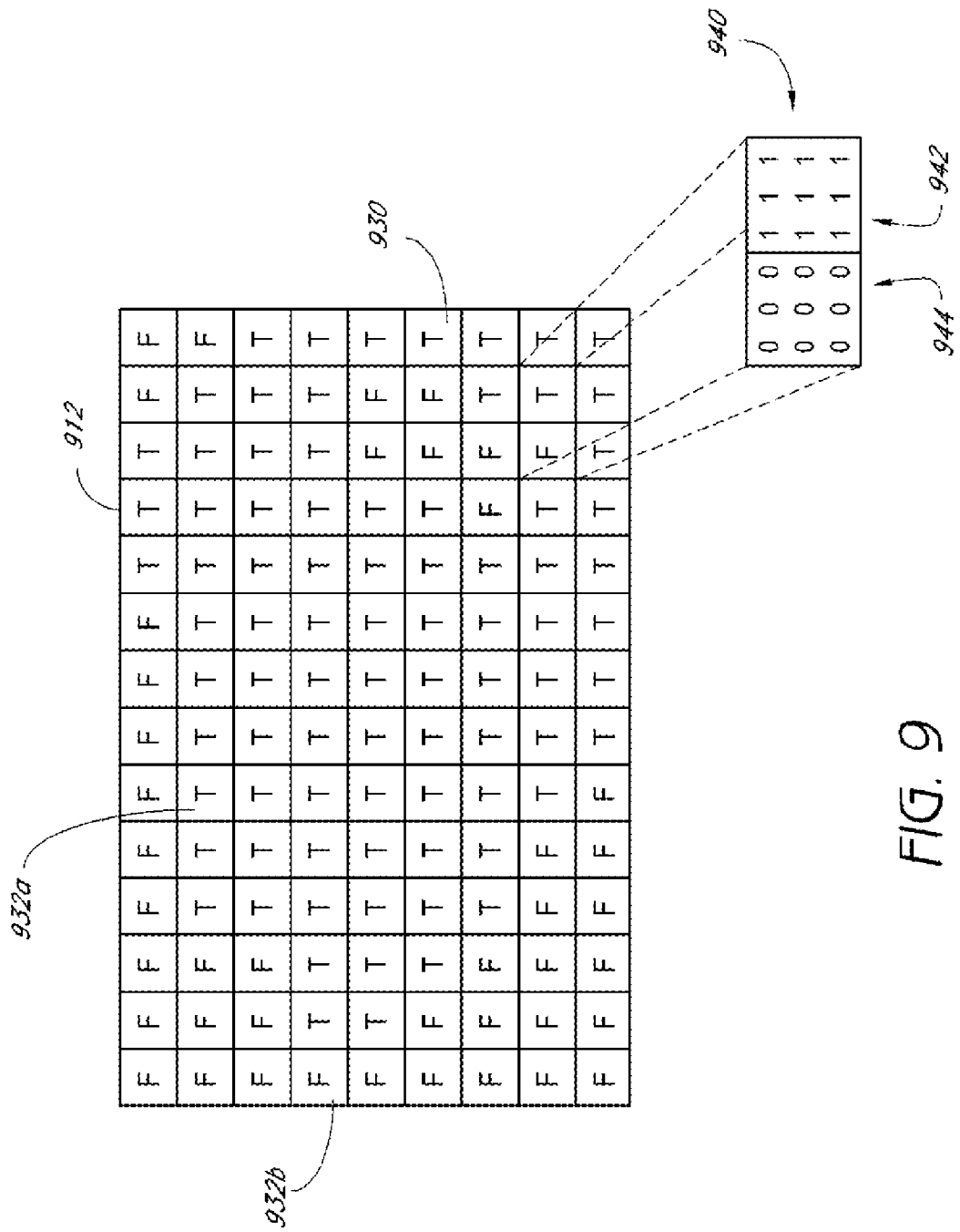
FIG. 9 is a block diagram illustrating an embodiment of a frame processed by a post-renderer.

FIG. 9 illustrates an embodiment of an example frame 912 processed by a post-renderer, such as the post-renderer 660 of FIG. 6. The pattern decision 650 output b from the decision block 646, which includes True and False values 932a, 932b (e.g., ones or zeros in one possible digital representation), is applied to the pixels in each block 930. In the example embodiment, the True values 932a indicate the presence of a pattern in a block 930, and the false values 932b indicate that no pattern exists in a block 930. Although the blocks 930 are shown as squares, in alternative embodiments the blocks 930 may be rectangles.

The True or False value 932a, 932b is copied to each pixel within the block 930, as shown in the expanded view 940 of two adjacent blocks 930. However, in some implementations, the transition between some blocks 930 may be abrupt. An example abrupt transition is illustrated by the expanded view 940 of a block 930 having True values 932a (represented by ones) next to a block 930 having False values 932b (represented by zeros). The left-most column 942 of ones in the True block 930 is adjacent to the right-most column 944 of zeros in the False block 930. Thus, there is an abrupt transition from the value 0 to the value 1 between the blocks 930.

In one embodiment these abrupt transitions may cause visual artifacts in an interpolated image. Accordingly, in one embodiment, a filter is applied to the frame 912 to smooth out the transitions. This filter may be a low pass filter, a mean filter, or the like. In one implementation, the filter is a low-pass finite impulse response (FIR) filter having a five pixel by five pixel window, with the decision values in the window set to one, multiplied by $\frac{1}{25}$. In such an embodiment, after low pass filtering, the decision values in each block 930 are real values ranging from zero to one (e.g., [0, 1]), rather than having only zero or one values. These values are pattern levels w, which represent the amount of pattern existing in each pixel of a frame. The pattern levels w may be used to improve interpolation between frames, as discussed in FIG. 10.

Figure 10:
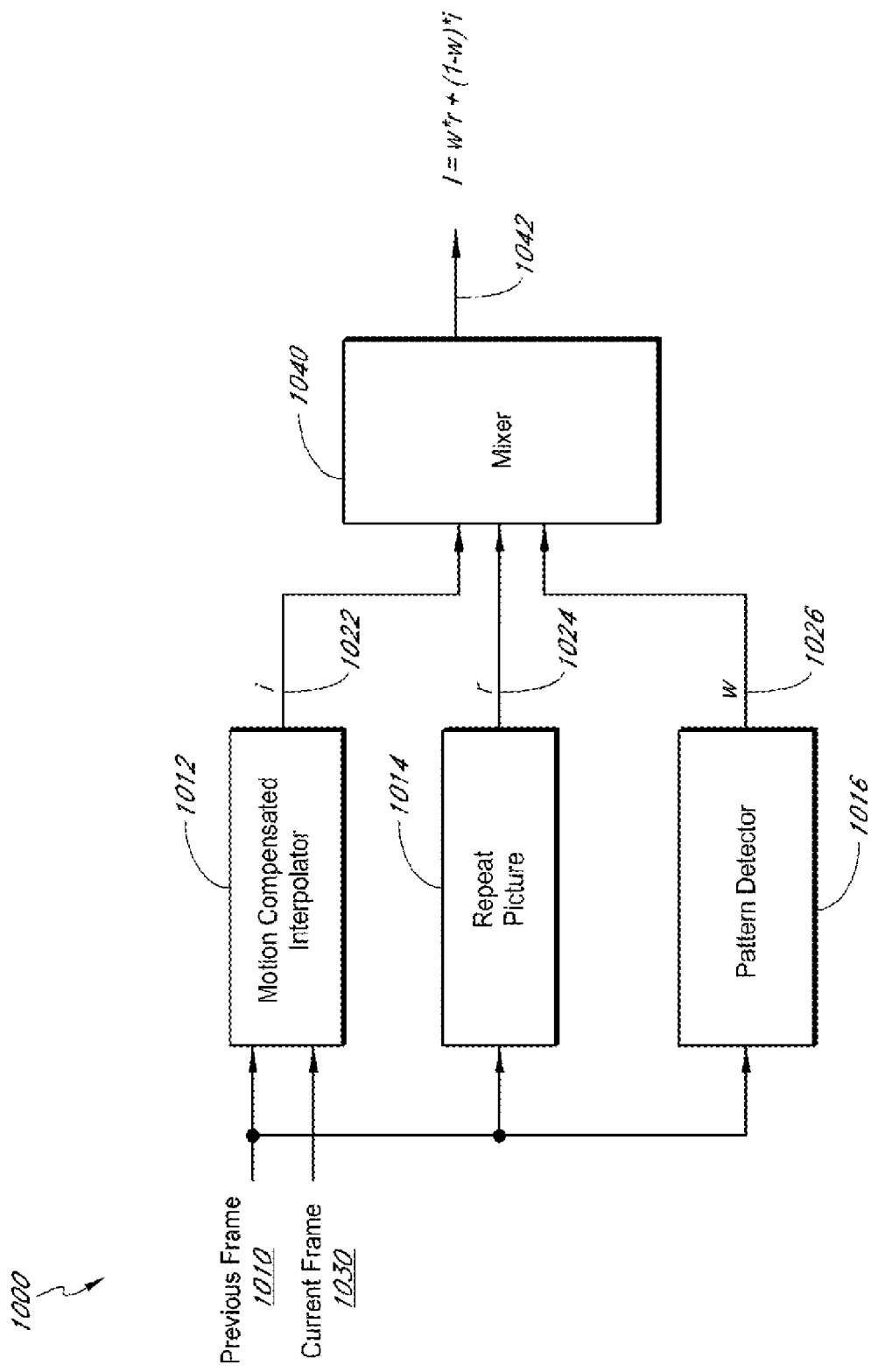
FIG. 10 is a functional block diagram illustrating an embodiment of an interpolation system.

FIG. 10 illustrates an embodiment of an interpolation system 1000. The interpolation system 1000 of certain embodiments enhances motion compensated interpolation with pattern detection information. Advantageously, the interpolation system 1000 thereby provides more accurately interpolated frames.

The interpolation system 1000 in the depicted embodiment receives a previous frame 1010 and a current frame 1030. The previous frame 1010 and the current frame 1030 are both provided to a motion compensated interpolator 1012 and a pattern detector 1016. In addition, the previous frame 1010 is provided to a repeat picture block 1014. The outputs 1022, 1024, 1026 of the motion compensated interpolator, the repeat picture block 1014, and the pattern detector 1016 are shown as pixels i 1022 and r 1024 and pattern level w 1026. In alternative embodiments, the outputs 1022, 1024, 1026 include more than one pixel or value, such as a matrix of pixels i 1022, a matrix of pixels r 1024, and a matrix of pattern level values w 1026, respectively.

Figure 11:
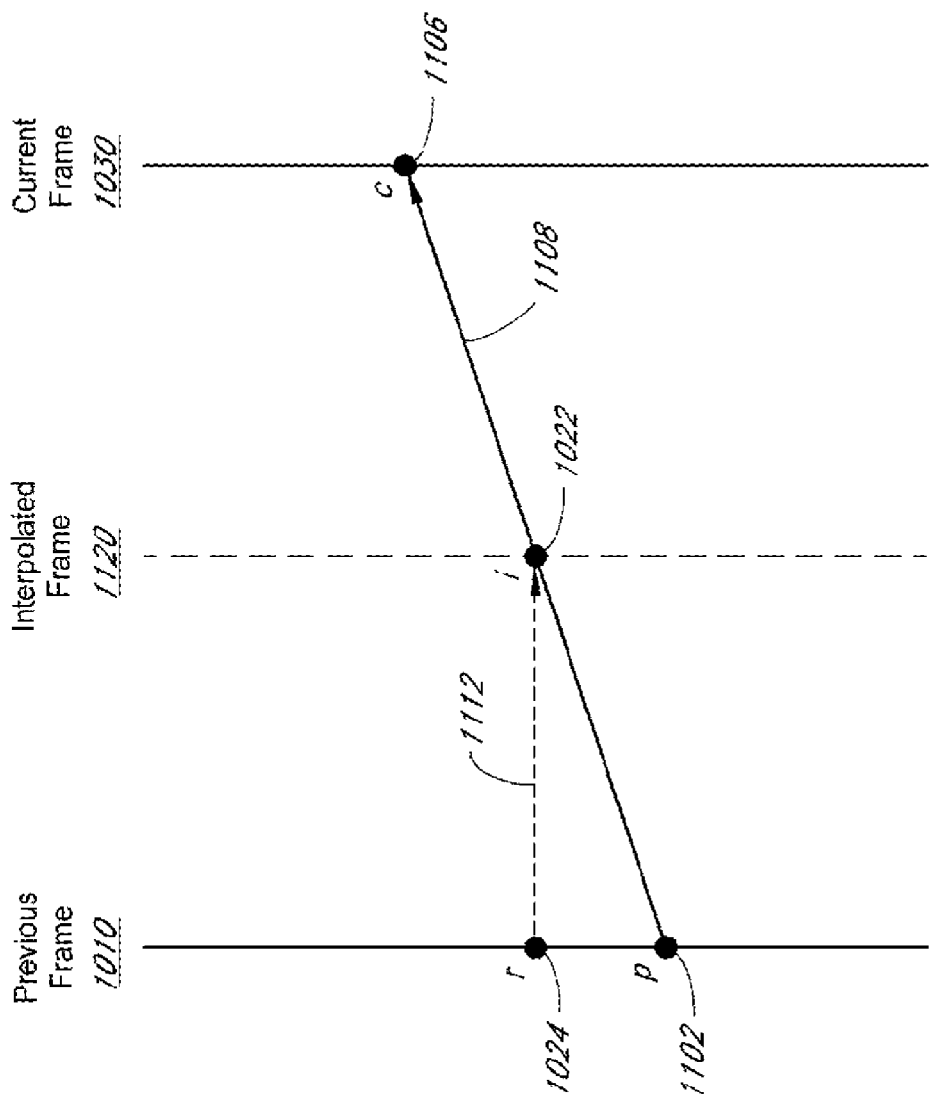
FIG. 11 is a graphic illustration of example frames in accordance with the interpolation system of FIG. 10.

The motion compensated interpolator 1012 derives motion vectors between blocks in the previous frame 1010 and blocks in the current frame 1030. An example motion vector 1108 generated by the motion compensated interpolator 1012 is illustrated in FIG. 11. The motion vector 1108 illustrates movement between a previous pixel p 1102 in the previous frame 1010 and a current pixel c 1106 in the current frame 1030. A point on the motion vector 1108 between the previous and current frames 1010, 1030 is selected as an interpolated pixel i 1022. In the depicted embodiment of FIG. 11, the interpolated pixel i 1022 is shown at the midpoint of the motion vector 1108. Other locations for the interpolated pixel i 1022 may also be chosen.

Referring again to FIG. 10, the motion compensated interpolator 1012 provides the interpolated pixel i 1022 to the mixer 1040, whose operation will be described in detail below.

The repeat picture block 1014 receives the previous frame 1010 and provides a repeat pixel r 1024 to the mixer 1040. The repeat pixel r 1024 is a pixel from the previous frame 1010 and is located in the same position in the previous frame 1010 as the interpolated pixel i 1022 in the interpolated frame 1120. In certain embodiments, the repeat picture block 1014 is not provided in the interpolation system 1000, but instead the previous frame 1010 is provided as a matrix of pixel values r directly to the mixer 1040.

The pattern detector 1016 receives the previous frame 1010 and provides a pattern level w 1026 to the mixer 1040. In one embodiment, the pattern detector 1016 performs the functions of a pattern detection and rendering system, such as the pattern detection and rendering system 600 of FIG. 6. The pattern level w 1026 in one such embodiment is obtained from a post-renderer, as described above with respect to FIG. 9.

The mixer 1040 of certain embodiments receives the interpolated pixel i 1022, the repeat picture pixel r 1024, and the pattern level w 1026. The mixer 1040 combines the pixels 1022, 1024 with the pattern level w 1026 to obtain an enhanced interpolated pixel I. In one configuration, the mixer 1040 applies a greater amount of the repeat pixel r 1024 value (e.g., luminance and/or chrominance value) to the enhanced interpolated pixel I when the pattern level w 1026 is high. Conversely, the mixer 1040 of certain embodiments applies a greater amount of the interpolated pixel i 1022 value when the pattern level w 1026 is low. In other words, the greater the amount of pattern level present, the greater the amount of the repeat picture pixel value r 1024 is mixed into the enhanced interpolated pixel I, and the less pattern level present, the greater the amount of the interpolated pixel value i 1022 is mixed into the enhanced interpolated pixel I.

Mathematically, the enhanced interpolated pixel I may be represented in one embodiment as the convex combination $I=w*r+(1-w)*i$. This equation illustrates that when the pattern level w 1026 is 0, I=i, and when the pattern level w 1026 is 1, I=r. In between the pattern level w 1026 values of 0 and 1, the r and i values are weighted differently to provide a mix of r and i values. Thus, the interpolation system 1000 enhances an interpolation scheme with the pattern level w 1026.

Depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in a memory, such as RAM memory, flash memory, ROM memory, EPROM memory, EEPROM memory, registers, hard disk, a removable disk, a CD-ROM, or any other form of memory known in the art. An exemplary memory is coupled to the processor such the processor can read information from, and write information to, the memory. In the alternative, the memory may be integral to the processor. The processor and the storage unit may reside in an ASIC. The ASIC may reside in a user terminal. In the alternative, the processor and the memory may reside as discrete components in a user terminal.

While the above detailed description has shown, described, and pointed out novel features as applied to various embodiments, it will be understood that various omissions, substitutions, and changes in the form and details of the device or process illustrated may be made without departing from the spirit of the disclosure. As will be recognized, certain embodiments of the inventions described herein may be embodied within a form that does not provide all of the features and benefits set forth herein, as some features may be used or practiced separately from others. The scope of the inventions is indicated by the appended claims rather than by the foregoing description. All changes which come within the meaning and range of equivalency of the claims are to be embraced within their scope.

What is claimed is:

1. A system for processing a video signal, the system comprising:
   a pixel sampling module configured to define a horizontal sampling window and a vertical sampling window within a block in a video frame of the video signal, the horizontal and vertical sampling windows configured to sample a set of pixel values;
   a signal processor configured to calculate a fast Fourier transform (FFT) of the pixel values in the horizontal sampling window for forming a horizontal frequency spectrum and in the vertical sampling window for forming a vertical frequency spectrum;
   a spectrum analyzer configured to:
      compute a horizontal power spectrum from the horizontal frequency spectrum and a vertical power spectrum from the vertical frequency spectrum,
      analyze the horizontal and vertical power spectrums for the presence of a peak, wherein the presence of the peak within the horizontal or the vertical power spectrums indicates the presence of a periodic pattern for the set of pixel values within the video frame; and
   a mixer for obtaining an enhanced interpolated pixel from an interpolated pixel according to the presence of the periodic pattern within the video frame, for displaying on a screen.

2. The system of claim 1, wherein the spectrum analyzer is further configured to determine whether a power at the peak exceeds a predetermined threshold.

3. The system of claim 1, wherein the spectrum analyzer is further configured to determine whether a ratio of peak power to total power exceeds a predetermined threshold.

4. The system of claim 1, further comprising a post-renderer configured to provide a pattern level corresponding to one or more pixels in the image.

5. The system of claim 4, further comprising an interpolator configured to use the pattern level to enhance interpolation between the frame and another frame.

6. A method for processing an image, the method comprising:
   defining a set of pixel values in an image using a window;
   calculating a Fourier transform of the pixel values within the window, the Fourier transform of the pixel values forming a spectrum;
   analyzing the spectrum of the Fourier transform to find a peak;
   analyzing the peak to determine whether the peak is indicative of the presence of a pattern for the pixel values within the image; and
   obtaining an enhanced interpolated pixel from an interpolated pixel according to the presence of the pattern for displaying on a screen.

7. The method of claim 6, wherein the spectrum is a power spectrum.

8. The method of claim 6, wherein analyzing the spectrum of the Fourier transform further comprises determining whether there is a single peak in the spectrum.

9. The method of claim 6, wherein analyzing the spectrum of the Fourier transform further comprises determining whether the peak exceeds a threshold value.

10. The method of claim 6, further comprising determining whether a ratio of peak power to total power exceeds a threshold value.

11. The method of claim 6, wherein the window comprises a horizontal one-dimensional window and a vertical one-dimensional window.

12. The method of claim 11, wherein the existence of a peak in either the horizontal or vertical one-dimensional window indicates the presence of a pattern in the image.

13. The method of claim 6, wherein the pixel values comprise luminance values.

14. The method of claim 6, further comprising post-rendering the image to provide a pattern level corresponding to one or more pixels in the image.

15. The method of claim 6, further comprising performing interpolation using the pattern level.

16. A method of processing an image, the method comprising:
   defining a set of pixel values in an image using a window;
   calculating a Fourier transform of the pixel values, the Fourier transform of the pixel values forming a spectrum;
   analyzing the spectrum of the Fourier transform to find a peak;
   analyzing the peak to determine whether the peak is indicative of the presence of a pattern for the pixel values within the image; and obtaining an enhanced interpolated pixel from an interpolated pixel according to the presence of the pattern for displaying on a screen.

17. The memory of claim 16, wherein the spectrum is a power spectrum.

18. An apparatus for processing an image, the apparatus comprising:
- means for defining a set of pixel values in an image using a window;
- means for calculating a Fourier transform of the pixel values within the window, the Fourier transform of the pixel values forming a spectrum;
- means for analyzing the spectrum of the Fourier transform to find a peak;
- means for analyzing the peak to determine whether the peak is indicative of the presence of a pattern for the pixel values within the image; and
- means for obtaining an enhanced interpolated pixel from an interpolated pixel according to the presence of the pattern for displaying on a screen.

19. The apparatus of claim 18, wherein the spectrum is a power spectrum.

20. A system for processing a video sequence, the system comprising:
- a sampling module configured to define a set of pixel values in a video frame using a sampling window;
- a signal processor configured to calculate a mathematical transform of the pixel values within the sampling window, the mathematical transform configured to form a spectrum of values; and
- a spectrum analysis module configured to:
  - analyze the spectrum to find a peak to determine whether the peak is indicative of the presence of a pattern for the pixel values in the image; and
  - a mixer for obtaining an enhanced interpolated pixel from an interpolated pixel according to the presence of the periodic pattern within the video frame, for displaying on a screen.

21. The system of claim 20, wherein the spectrum analysis module is for analyzing a power spectrum.

* * * * *